United States Patent [19]

Schlanger

[11] Patent Number: 5,533,111

[45] Date of Patent: Jul. 2, 1996

[54] SYSTEM FOR ORIGINATING AND RECEIVING TELEPHONE CALLS OVER A VIRTUAL PIPED CONNECTION, AND SPECIALIZED CUSTOMER PREMISE EQUIPMENT FOR USE IN THE SYSTEM

[75] Inventor: Gabriel G. Schlanger, West Orange, N.J.

[73] Assignee: AT&T Corp., Murray Hill, N.J.

[21] Appl. No.: 367,386

[22] Filed: Dec. 30, 1994

[51] Int. Cl.$^6$ .......................... H04M 3/42; H04M 11/00; H04M 7/00
[52] U.S. Cl. .......................... 379/201; 379/94; 379/207; 379/219; 379/222; 379/229; 379/235; 379/237
[58] Field of Search ..................... 379/144, 201, 379/207, 216, 219, 220, 222, 224, 229, 230, 231, 235, 236, 237, 354, 355, 357, 94

[56] References Cited

U.S. PATENT DOCUMENTS

| | | | |
|---|---|---|---|
| 4,802,199 | 1/1989 | Lange et al. | 379/216 X |
| 4,982,421 | 1/1991 | Kirsch et al. | 379/246 X |
| 5,023,904 | 6/1991 | Kaplan et al. | 379/207 X |
| 5,181,238 | 1/1993 | Medamana et al. | 379/207 X |
| 5,459,779 | 10/1995 | Backaus et al. | 379/207 X |
| 5,481,600 | 1/1996 | Alesio | 379/144 X |

Primary Examiner—Jeffery Hofsass
Assistant Examiner—Harry S. Hong
Attorney, Agent, or Firm—Barry H. Freedman

[57] ABSTRACT

Access (or egress) charges payable by an IXC to a LEC, and payable by the subscriber to the LEC for originating or terminating calls and for associated vertical call control features, are reduced or eliminated by providing a virtual piped collection that "bypasses" and thus does not require the involvement of, a local service provider. The virtual piped connection exists between a call control platform (CCP) in the IXC network, and specialized customer premises equipment (CPE) located m the subscriber location. The specialized CPE is arranged to provide call control functions using normal out-of-band signaling in a conventional manner, and, after an initial call is conventionally set up to the CCP, to provide the same functions using specialized in-band signaling. A complementary signaling and control capability is provided in the CCP. Once the pipe is established, the subscriber can originate calls by pressing appropriate buttons or keys on the specialized CPE, causing in-band signaling between the CPE and the complementary equipment in the CCP. Such signaling is not detected by and does not affect the connection that exists through the LEC. When a call is complete, it may be disconnected by either the subscriber or the CCP, by pressing a special button or key on the CPE, which sends an in-band signal to the CCP, to terminate the call without disturbing the pipe existing between the CPE and the CCP. Similarly, incoming calls are routed via the CCP, which uses in-band signaling to alert the specialized CPE.

27 Claims, 9 Drawing Sheets

SYSTEM FOR ORIGINATING AND RECEIVING TELEPHONE CALLS OVER A VIRTUAL PIPED CONNECTION, AND SPECIALIZED CUSTOMER PREMISE EQUIPMENT FOR USE IN THE SYSTEM

FIELD OF THE INVENTION

This invention relates generally to a telecommunications system for originating and receiving calls using a virtual piped connection that "bypasses" and thus does not require the involvement of, a local service provider with respect to vertical and call control features and functions, and, in particular, to such a system that uses specialized customer premises equipment.

BACKGROUND OF THE INVENTION

Conventional systems for originating and receiving telephone calls, particularly long distance or international telephone calls, typically involve routing through the facilities (e.g., switches) of a "local service provider", i.e., a so-called "local exchange carrier" or LEC in the United States or a PTT in foreign countries. With respect to outgoing calls placed from a subscriber location, the LEC switch serving the subscriber's customer premises equipment (CPE) senses an off-hook condition and extends dial tone. When the dialed digits are received in the LEC switch, any features associated with the originating subscriber, such as speed dialing, are applied to the call, and the call is then routed to the desired destination. If the call is a long distance call that is thereafter routed to a long distance or interexchange carrier (IXC) such as AT&T, then the IXC will pay the LEC for servicing the call, in the form of an "access charge", and the subscriber pays the LEC for the call and for any originating features used.

With respect to incoming calls received at a called party location, a similar condition prevails. Long distance calls destined for a called party are routed by the IXC to the terminating switch operated by the LEC that serves the called party location. Here, any features associated with the called subscriber location, such as call forwarding, distinctive ringing and so on, are applied to the call, and the call is then completed. Here again, the IXC will pay the LEC for servicing the call, in the form of an "access (or egress) charge", and the subscriber will pay the LEC for any terminating vertical services provided.

SUMMARY OF THE INVENTION

In accordance with the present invention, the access (or egress) charges payable by an IXC to a LEC, and payable by the subscriber to the LEC for originating or terminating vertical features, are reduced or eliminated by establishing a virtual "pipe" between specialized customer premises equipment (CPE) located at the subscriber location and a specially configured call control platform in the IXC network. The pipe is established through an initial call made from the specialized CPE, operating in a "conventional mode", to the call control platform. Once the pipe is established, the specialized CPE operates in a "bypass mode", such that calls made by the subscriber using the specialized CPE "bypass" the LEC, and thus does not require the involvement of a local service provider with respect to both incoming and outgoing calls. As long as the virtual pipe exists, the IXC can provide vertical and call control features and functions for incoming and outgoing calls. The LEC is thus not involved in or aware of the calls originated and received by the subscriber, nor aware of the subscriber's vertical features. This enables the IXC to provide to the subscriber the same set of vertical call features and functions, wherever the subscriber may be located and when the subscriber may be traveling.

At a customer premise location, where calls are originated and/or received, the specialized customer premises equipment is arranged to provide call control functions such as call origination, off-hook, on-hook, and ringing, using normal out-of-band signaling while in the conventional mode, and, after the piped connection to the call control platform is established, to provide the same functions using specialized in-band signaling, while in the bypass mode. A complementary signaling and control capability is provided in the specially configured call control platform.

In operation, when a user of the present invention, hereinafter called a subscriber, arrives at a location at which they expect to originate and/or receive telephone calls, the subscriber replaces the conventional CPE at that location with the specialized CPE contemplated by this invention, if the specialized CPE is not already available and in place. The specialized CPE, while in the conventional mode, provides all of the functions associated with a conventional telephone, and can thus be used in a conventional manner as well as in the manner outlined below.

The subscriber then initiates a "standard" telephone call to the specially configured call control platform in the IXC network, illustratively by dialing a local, toll free number or a toll free 800 number. Based upon the number called, or other identification mechanism, the call is recognized by the call control platform as a special call, such that the connection between the CPE and the platform is maintained for an extended period of time. This connection constitutes a "pipe" through which successive outgoing and incoming calls may flow. In-band information exchange between the CPE and the call control platform identifies the subscriber, such as with a "personal ID", and security may be provided with the entry of a PIN or by recognition of the subscriber's voice. Similarly, the same approach may be used in a foreign country, where a connection is established to a call control platform in that country or elsewhere, via a local or international toll-free access mechanism. Note that the present invention could also be used even if the call to the call control platform is not toll-free.

Once the pipe is established, the CPE is arranged to operate in the bypass mode, so that it responds to in-band signaling from the call control platform and is disabled from generating a conventional mode disconnect signal that would otherwise cause the CPE to be disconnected from said call control platform when the handset of the CPE is returned to its cradle, such that the CPE would be considered to have been placed in an on-hook condition. The CPE may be switched between the conventional mode and the bypass mode locally, by actuation of a button or entry of a sequence of keystrokes, or remotely, by a command signal generated in the call control platform.

The subscriber can now originate calls by pressing appropriate buttons or keys on the specialized CPE, illustratively the "#" key, causing in-band signaling between the CPE and the complementary equipment in the call control platform. Such signaling is not detected by and does not affect the connection that exists through the LEC. The call control platform can provide various originating features and functions that the subscriber desires, based upon a profile in the platform that is associated with the personal ID. The subscriber can return the CPE handset to its cradle between outgoing telephone calls, and the connection to the call control platform will not be disconnected because the CPE is disabled from generating a conventional mode disconnect signal.

With respect to calls placed to the subscriber, these calls are made using the personal ID or other technique which causes the calls to be routed to the call control platform in the IXC network. From the platform, the specialized CPE for the called subscriber is alerted over the "pipe" by in-band signaling, which again is not detected by and does not affect the connection that exists through the LEC, but which is recognized by the CPE and can, for example, cause distinctive ringing to occur at the CPE. With respect to the incoming calls, the call control platform can also provide various terminating features and functions that the subscriber desires, such as call forwarding, based upon a profile in the platform that is associated with the personal ID.

If a call is made to the CPE location without using the personal ID number, the call would be routed conventionally to the LEC switch serving the destination location. The LEC would, in turn, either generate a busy signal to the originator of the new incoming call, or, in accordance with an aspect of the present invention, a "call waiting" signal would be generated by the LEC and applied to the CPE. This signal is recognized in the CPE, and causes the CPE to generate an alerting tone or signal. The subscriber would then have the option to (a) answer the newly received call, or (b) ignore that call.

When a call that has been established via the call control platform is complete, it may be disconnected by either the subscriber or the call control platform, by pressing a special button or key or sequence of keys (illustratively **X) on the CPE, which sends an in-band signal to the control platform, to terminate the call without disturbing the pipe existing between the CPE and the platform. A similar sequence may be initiated for the call disconnect from the call control platform. Accordingly, the LEC is unaware of the activity taking place using in-band signaling in the pipe, and will not charge for "new" access or egress as is currently the case.

If desired, the pipe that is set up between the CPE and the call control platform may be torn down automatically, if not used within a predetermined period of time, or may be torn down only in response to certain pre-arranged signaling sequences. A special button or key may be pressed on the CPE to return the CPE from the bypass mode to the conventional mode, in order to re-enable the switch hook for normal operation.

While the foregoing summary describes the present invention in terms of a piped connection that traverses a LEC network and permits that network to be bypassed after an initial call is established between specialized CPE and a call control platform in the IXC network, it is to be understood that the LEC network can be any type of "local network", which term is meant to encompass networks such as (a) a local exchange carrier such as Bell Atlantic or an independent local carrier, (b) a mobile telephone switching office, such as an MTSO operated by Cellular One, (c) a foreign telephone switching office operated by a PTT, or (d) a local Personal Communications Service switching office that provides wireless personal communications. Similarly, the IXC network can be any type of "long distance network", which term is meant to encompass networks such as toll, tandem, or intermediate networks, including (a) the long distance network of AT&T Corp., and (b) the network of an international carrier operating in a foreign country in which local service is provided by a PTT.

DETAILED DESCRIPTION

Figure 1:
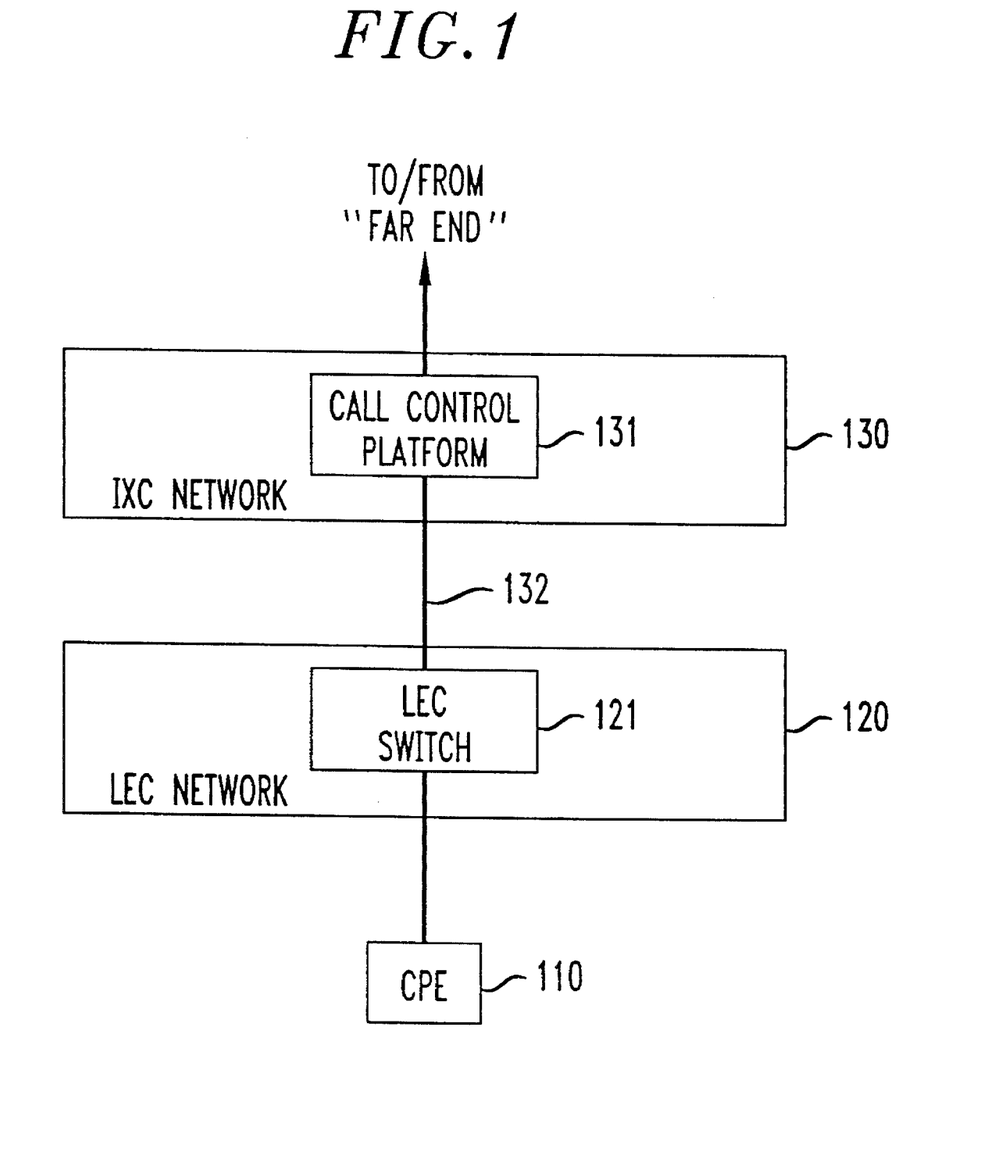
FIG. 1 is an overall block diagram illustrating the relationship between specialized CPE and a call control platform disposed in an interexchange carrier (IXC) network, in accordance with the present invention.
Figure 2:
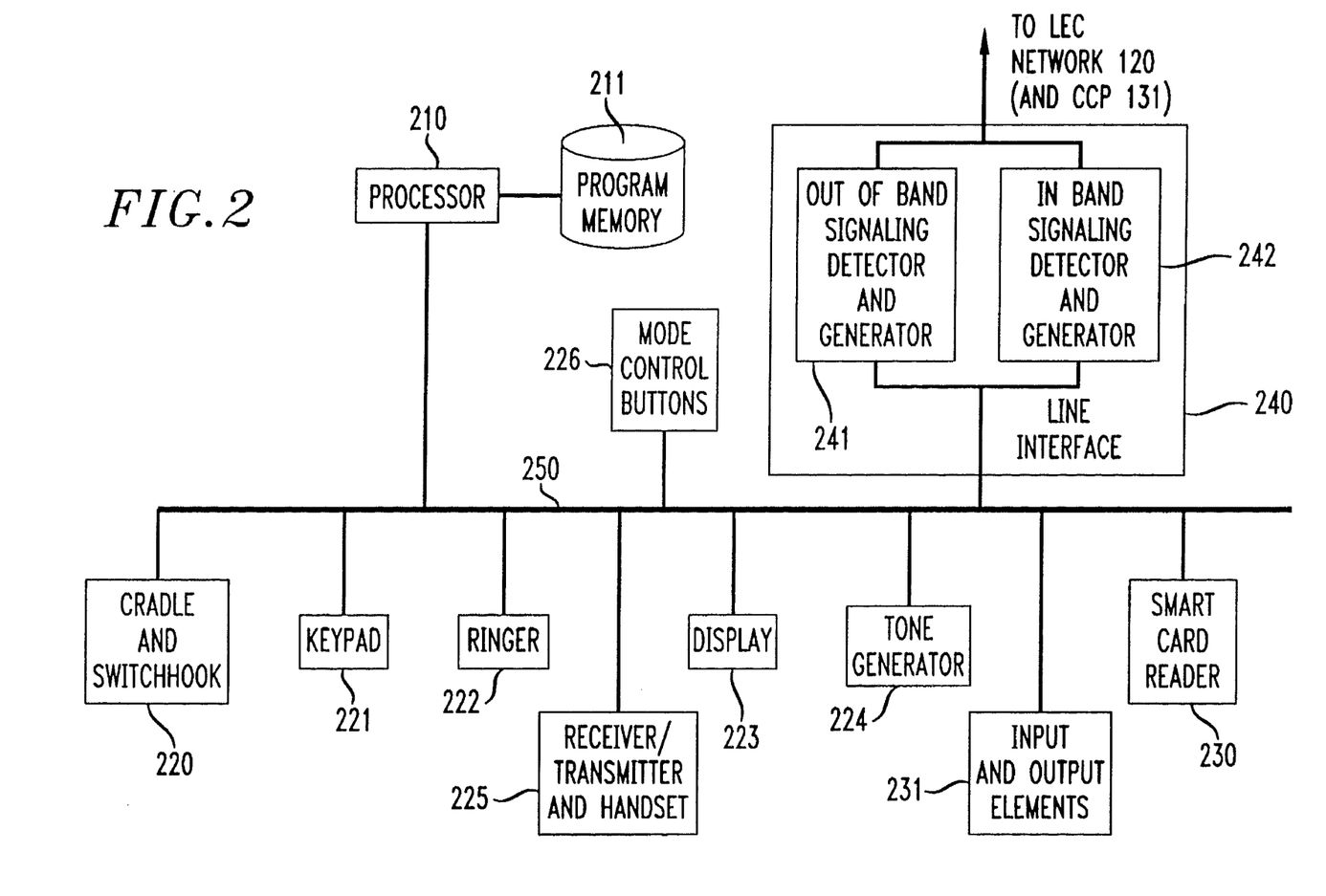
FIG. 2 is a block diagram of specialized CPE 110 of FIG. 1 that may be used in accordance with the present invention to establish a "pipe" between CPE 110 and call control platform 131 in IXC network 130 of FIG. 1.

Referring first to FIG. 1, there is shown an overall block diagram illustrating the relationship between specialized CPE and a call control platform disposed in an interexchange is carrier (IXC) network, in accordance with the present invention. CPE 110, which is "specialized" CPE as described more fully below in connection with FIG. 2, is connected to and served by a LEC switch 121 in LEC network 120. When the present invention is utilized by a subscriber at CPE 110, an initial call is made from CPE 110 through LEC switch 121 to a call control platform (CCP) 131 in IXC network 130. This initial call may illustratively be completed by dialing (a) a local toll-free number, such as a call to the "576" exchange, or (b) an "800" toll free number, either of which cause a call received in switch 121 to be routed to CCP 131 via circuit or trunk 132. Note that the present invention could also be used even if the call to the CCP is not toll-free, or if the call originates in a foreign country. Note also that certain other elements in and portions of LEC network 120 and IXC network 130, such as additional switches, signaling networks, databases, and so on, are not shown in FIG. 1, in order to simplify the description and focus attention on the salient portions of the present invention.

In accordance with the present invention, once the initial connection is established between CPE 110 and CCP 131, this connection is maintained "intact" notwithstanding the fact that the handset of CPE 110 is replaced in its cradle. This is accomplished, as explained more fully below, by arranging CPE 110 such that it switches, after the initial connection is established, from a conventional mode to a bypass mode in which it is disabled from generating a disconnect signal that would otherwise cause the CPE to be disconnected from the call control platform when the CPE is placed in an on-hook condition. In other words, in the bypass mode, CPE 110 is inhibited from generating "out-of-band" signals (such as a switch hook actuation) that are normally interpreted by LEC switch 121 as a signal to tear down an already established connection. In this way, the connection between CPE 110 and CCP 131 stays in effect until intentionally terminated. Such intentional termination may be accomplished by a timing mechanism, or by activating a special button or key sequence on CPE 110 that switches the CPE from bypass mode to conventional mode, thereby restoring normal switch hook actuation and causing the connection to switch 121 to be dropped. The connection between CPE 110 and CCP 131 constitutes a "pipe" through which incoming and outgoing calls from and to a "far-end" device may flow. Note that in a foreign country, the LEC would be replaced by a PTT and the IXC could be an international carrier.

Referring now to FIG. 2, there is shown a block diagram of specialized CPE 110 of FIG. 1 that may be used in accordance with the present invention to establish a "pipe" between CPE 110 and call control platform 131 in IXC network 130 of FIG. 1. CPE 110 is referred to as "specialized" because, while it performs many of the conventional functions of a telephone instrument, it is arranged to provide both in-band and out-of-band signaling generation and detection in a non-conventional manner.

With respect to conventional functions, CPE 110 includes a conventional receiver/transmitter and handset 225, which is interconnected with other elements via a bus 250. A keypad 221 is provided so that a subscriber using the CPE may enter signals corresponding to dialed telephone numbers, or other sequences that are recognized as control sequences that cause specific actions to occur. A ringer 222, which may be a tone ringer, is arranged to provide different audible indications, for example, to alert a subscriber to an incoming call that arrives while a piped connection between CPE 110 and CCP 131 is in effect, and to differentiate such a call from a conventional call received when such a piped connection is not in effect. A display 223, which may be an LCD display, is arranged to provide visual information to a subscriber, indicating, for example, the digits dialed on keypad 221 during the initiation of a call, the time and date, calling number identification, and information regarding the status of various features and functions of the CPE. A tone generator 224 is arranged to generate audible tones that can be perceived by a subscriber through the handset, such as "call waiting" tones indicating during the course of an on-going call that another call has arrived.

CPE 110 is connected to LEC network 120 via a line interface 240 which provides two principal functions. First, an out-of-band signaling detector/generator 241 provides conventional control and supervisory signal functions with respect to incoming and outgoing calls. Second, an in-band signaling detector/generator 242 provides control and supervisory signal functions with respect to incoming and outgoing calls that are made while the pipe between CPE 110 and CCP 131 is in effect. Detector/generators 241 and 242 operate under the control of processor 210, which is a microprocessor that carries out program instructions stored in program memory 211. Various processes performed by these programs include originating an outbound call, discussed more fully below in connection with FIG. 5, and receiving an incoming call, discussed more fully below in connection with FIGS. 8 and 9.

When CPE 110 is operating in its conventional mode, detector/generator 241 responds to ringing signals applied by the LEC network 120, and causes ringer 222 to generate an audible alerting tone to indicate the arrival of an incoming call. If the call is answered by lifting the handset from its cradle, cradle and switch hook 220 generate a switch closure or other signal that is detected by LEC network 120, terminating the ringing signal and cutting the call through to receiver/transmitter and handset 225. Similarly, if the handset is removed from its cradle, this is detected by cradle and switch hook 220, which generates a switch closure or other signal that is detected by LEC network 120, causing dial tone to be applied so that an outgoing call may be initiated. This same functionality provides CPE 110 with the ability to conventionally initiate an initial toll free call to CCP 131, so that a piped connection between CPE 110 and CCP 131 can be established. All of the foregoing functions provided by CPE 110 when operating in the conventional mode are considered to involve "out-of-band" signaling, since the signaling involves switch closures, establishment of ground loops, application of and detection of battery and ringing voltages, etc., and does not involve generation and transmission of voice frequency tones except for dialing.

CPE 110 may be switched between conventional and bypass modes either locally or remotely. If switching between modes is controlled locally, CPE 110 may include designated mode control buttons 226, which, when pressed, switch the CPE from conventional mode to bypass mode, and, vice-versa, from bypass mode to conventional mode. Alternatively, switching between modes may be accomplished by entry of a specific sequence of key strokes on keypad 221. If switching between modes is controlled remotely, CPE 110 may be arranged to respond to signals generated by CCP 131.

After a piped connection between CPE 110 and CCP 131 has been established, and CPE 110 is operating in bypass mode, detector/generator 242 responds to in-band ringing signals applied by CCP 131, and causes ringer 222 to generate an audible alerting tone different from the tone generated in response to conventional calls, to indicate the arrival of an incoming call that was directed to CCP 131 when a person dialed a personal telephone number provided to the subscriber. If the call is answered by lifting the handset from its cradle, cradle and switch hook 220 generate an in-band switch closure signal that is not detected by LEC network 120, but rather is detected only by CCP 131. This signal causes termination of the ringing signal generated by CCP 131, and results in cutting the call through to receiver/transmitter and handset 225. Similarly, if the handset is removed from its cradle, this is detected by cradle and switch hook 220, which generates an in-band switch closure signal that is not detected by LEC network 120, but rather is detected only by CCP 131. This signal causes dial tone to be applied to CPE 110 from CCP 131, so that an outgoing call may be initiated. All of the foregoing functions provided by CPE 110 when operating in the bypass mode are considered to involve "in-band" signaling, since the signaling is accomplished by generation and transmission of voice frequency tones that have no effect on the connection through LEC switch 121. This means, for example, that even if the handset is returned to its cradle, the connection between CPE 110 and CCP 131 will not be terminated. Rather, termination occurs only when a special sequence is entered on keypad 221 and recognized in processor 210, or when a special button provided on CPE 110 that is part of input/output elements 231, is activated.

Note here that FIG. 2 also includes a "smart card" reader 230 connected to bus 250. Reader 230 is provided so that calls can be initiated using a credit card-like programmable data carrier, and information received during a call can be stored in such a card. Other optional input/output elements 231 include voice recognition and voice response circuitry.

Figure 3:
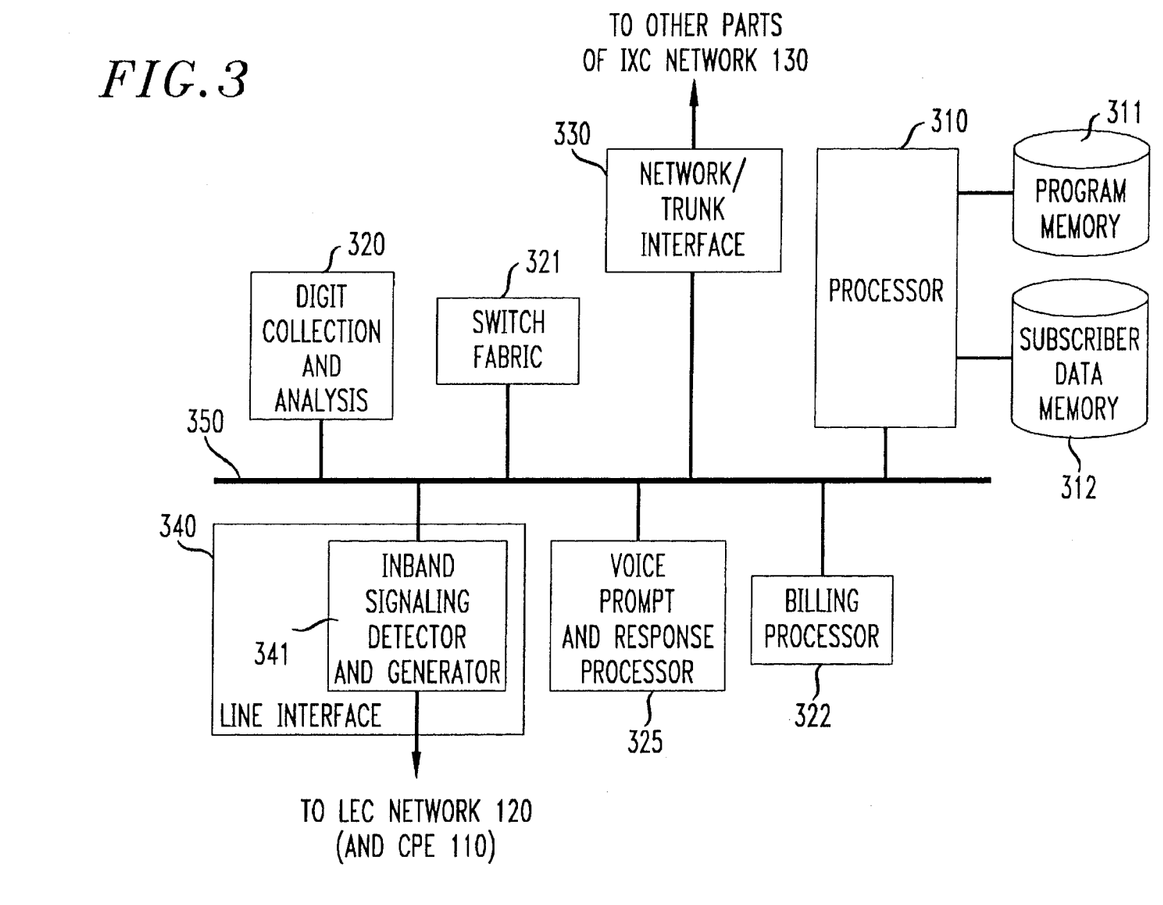
FIG. 3 is a block diagram of call control platform 131 of FIG. 1, arranged in accordance with the present invention.

FIG. 3 is a block diagram of call control platform 131 of FIG. 1, arranged in accordance with the present invention. The principal functions of this platform include (a) receipt and generation of in-band signaling messages to and from CPE 110, (b) routing of incoming calls to the appropriate subscriber, based upon the dialed number or other routing/call completion information received with a call, (c) routing of outgoing calls to the appropriate far-end destination, based upon dialed digits collected from the CPE, and (d) initiation of a billing process, if necessary. Many of the foregoing functions may be performed by an appropriately configured program controlled switch, such as the Conversant Voice Response Unit available from AT&T Corp., or by similar, commercially available equipment. Accordingly, the components shown in FIG. 3 are meant to be illustrative only, and not limit the arrangement that may be used by persons skilled in the art.

In FIG. 3, CCP 131 is connected to LEC network 120 (and through that network to CPE 110) via a line interface 340 that includes an in-band signaling detector/generator 341 that may be similar to detector/generator 242 of FIG. 2. CCP 131 does not require an out-of-band detector/generator, since that functionality is provided in the LEC switch 121, and CCP 131 does not respond to the same out-of-band signals to which switch 121 responds.

Incoming and outgoing calls are coupled through line interface 340 to and from a bus 350, which interconnects the other components of CCP 131. These components include a switch fabric 321, which provides that actual connection function between LEC network 120 and other elements in IXC network 130, which are coupled to bus 350 via a network/trunk interface 330. A digit collection and analysis element 320 may be connected to bus 350 and arranged to receive and analyze signals generated in CPE 110 using key pad 221 of FIG. 2, so that, with respect to outgoing calls, switch fabric 321 is enabled to provide the appropriate connections necessary to complete the calls. A voice prompt and response processor 325 is provided to generate voice prompts, collect responses made by way of voice or touch-tone entry, evaluate the responses, and perform other operations in accordance with stored control programs.

Processor 310, which may be a microprocessor operating under the control of program instructions stored in program memory 311, is arranged to control the overall functioning of CCP 131 and the components connected to bus 350. Various processes performed by these programs include originating an outbound call, discussed more fully below in connection with FIG. 6, and receiving an incoming call, discussed more fully below in connection with FIG. 7. A separate billing processor 322 may be part of CCP 131, or, alternatively, this functionality may be incorporated within processor 310. In either event, the billing function is initiated, as described more fully below, when, after a piped connection is established between CPE 110 and CCP 131, subsequent outbound calls are initiated from CPE 110. A subscriber data memory 312 contains profiles and other information relating to individual subscribers authorized to use the features and functions of CCP 131, and may be accessed by processor 310 when performing the various processes described below.

Figure 4:
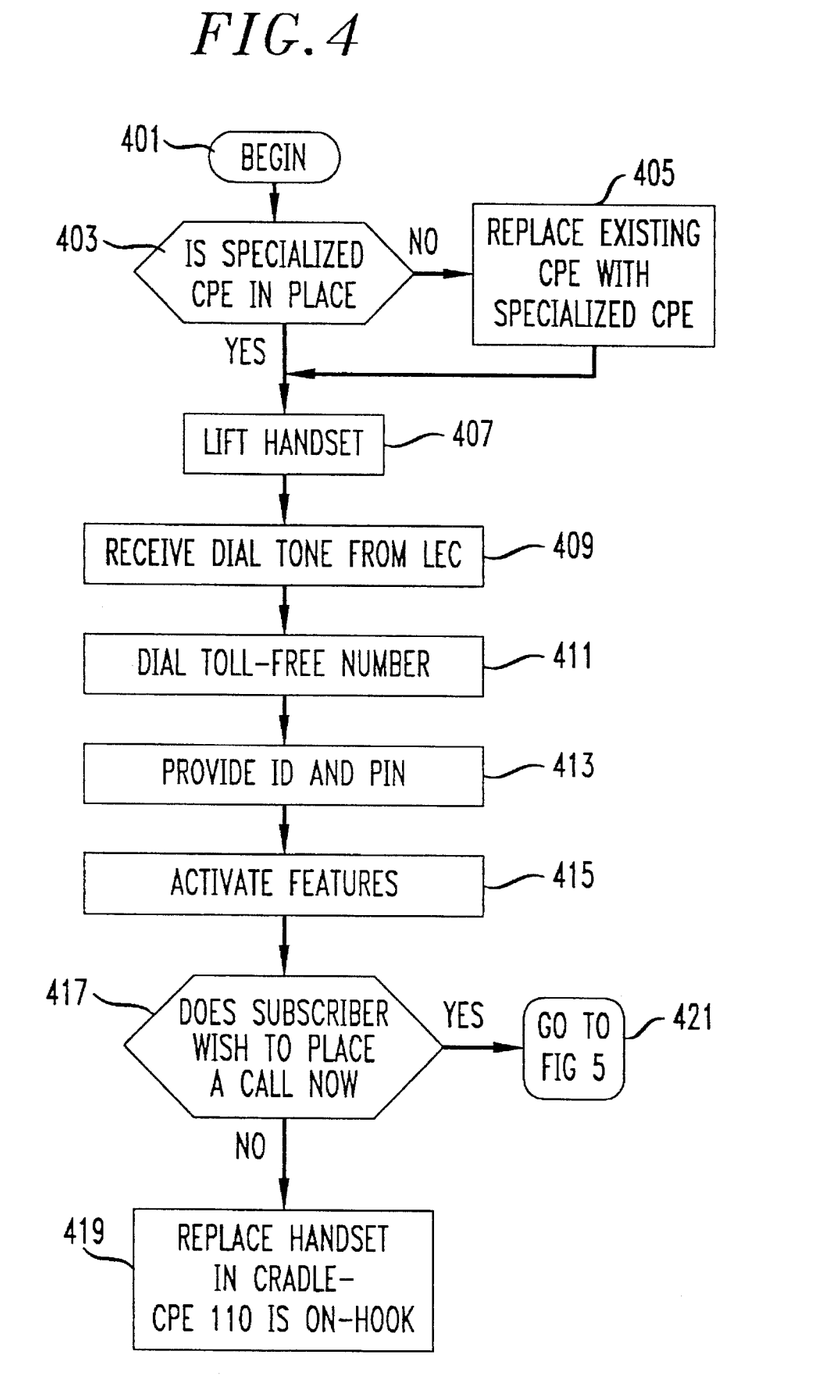
FIG. 4 is a flow diagram illustrating the steps in the process for establishing an initial connection constituting a "pipe" between the CPE 110 of FIG. 2 and call control platform 131 of FIG. 3.

Referring now to FIG. 4, there is shown a flow diagram illustrating the steps in the process for establishing an initial connection constituting a "pipe" between the CPE 110 of FIG. 2 and call control platform 131 of FIG. 3. This process is performed by a subscriber using CPE 110, but several steps in the process, as indicated below, are performed in CCP 131.

The process of FIG. 4 begins in step 401, and proceeds to step 403, in which a determination is made as to whether or not the "specialized" CPE (such as the CPE of FIG. 2) is in place, i.e., is connected to a telephone line at a place where a subscriber using the present invention intends to make and/or receive telephone calls. If not, the existing CPE is replaced with the specialized CPE in step 405, and the process proceeds to step 407. Note here that it is contemplated that the specialized CPE of FIG. 2 is portable, so that it may be carried from place to place by a subscriber. The CPE then may be "plugged in" to any standard telephone jack, as desired. This would be particularly useful in a situation where a salesperson desires to make and receive calls from "temporary office" or a hotel room.

In step 407, the subscriber lifts the handset on the CPE and receives dial tone from the LEC in step 409. The subscriber then dials a toll free number, such as a local toll free number or an 800 number, which initiates a call from the CPE through LEC network 120 to CCP 131 in IXC network 130. This process of calling a platform is familiar to many subscribers, and is used, for example, to place many types of operator assisted calls placed to the number 1-800-CALL-ATT. Note that the number dialed is not required to be a toll-free number; the present invention could be practiced using a conventional domestic or international long distance number.

When the connection between CPE 110 and CCP 131 is initially made, the caller is prompted in step 413 (for example, by voice prompt and response processor 325 of FIG. 3) to enter an identification (ID) and personal identification number (PIN), in order to identify and verify that the caller is in fact a subscriber authorized to use CCP 131 and the features and functions of the present invention. If the PIN is validated, the features associated with this particular subscriber are activated in step 415. As an example, subscriber data memory 312 of FIG. 3 may contain a profile for each subscriber, including a speed dialing list to be used in connection with outbound calls, a call forwarding profile, to be used in connection with incoming calls to provide alternate routing, a billing profile to indicate how (e.g., to which account) outgoing calls should be billed, and an operating profile to indicate, for example, how long a piped connection should be maintained before it is automatically disconnected. Alternatively, the subscriber profile may be downloaded from elsewhere in the IXC network following subscriber identification and verification.

Figure 5:
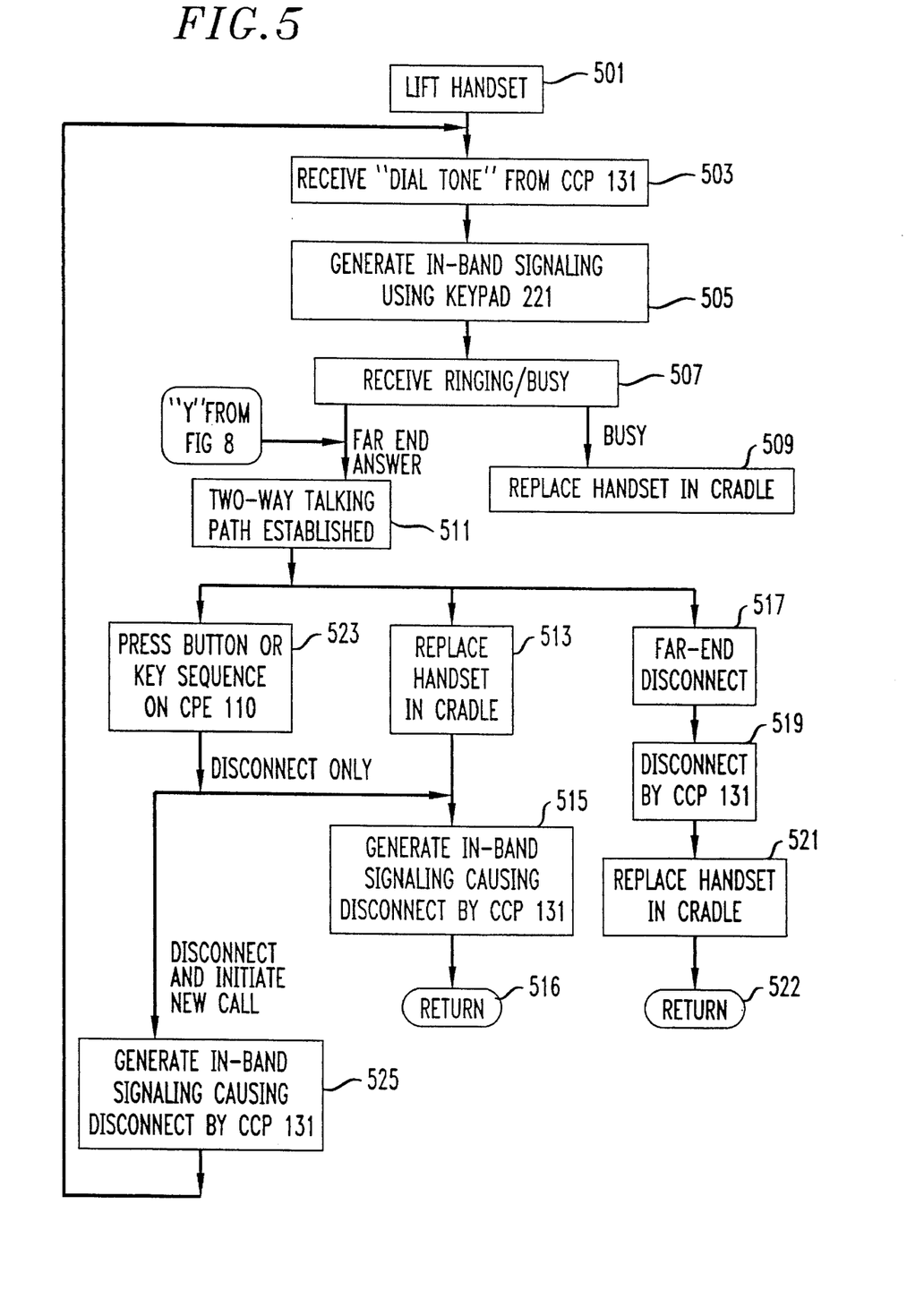
FIG. 5 is a flow diagram illustrating the steps in the process performed in CPE 110 for originating an outbound call.

Following completion of step 415, the subscriber may be queried, in step 417, to determine if the subscriber desires to place a call to a far-end destination at the present time. If so, the process illustrated in FIG. 5 is performed. On the other hand, if a NO result occurs in step 417, the handset of CPE 110 is returned to its cradle in step 419. At this point, CPE 110 is considered to be "on hook". However, because of the arrangement of CPE 110, as described previously, the on-hook status is not detected by switch 121 in LEC network 120, because the on-hook status is evidenced by an in-band rather than an out-of-band signal. Accordingly, switch 121 does not disconnect the connection between CPE 110 and CCP 131.

Referring now to FIG. 5, there is shown a flow diagram illustrating the steps in the process performed in CPE 110 for originating an outbound call. Subsequently, in connection with FIG. 6, the steps performed in CCP 131 in originating the same call will be described.

When a subscriber lifts the handset of CPE 110 in step 501, the subscriber receives a dial tone from CCP 131 in step 503. This is not the conventional dial tone received when the handset of conventional CPE is lifted, since (a) CPE 110 is now connected, via a piped connection, to CCP 131, and (b) the actuation of the switch hook caused by lifting the handset is not detected by switch 121, since the conventional out-of-band signaling does not occur.

In step 505, the subscriber dials the number of the desired far-end destination using keypad 221, and thereby generates in-band signaling that is received by CCP 131 in digit collection and analysis element 320. The call is routed by switch fabric 321 through network/trunk interface 330 to the appropriate destination, causing CPE 110 to receive a ringing or busy signal in step 507, depending upon the status of the far-end destination. If the far-end destination is busy, the subscriber replaces the handset in the cradle in step 509, and the same or another call may be initiated by repeating the process of FIG. 5 from the beginning. If the far-end answers, the process proceeds to step 511, in which a two-way talking path is established between the subscriber using CPE 110 and the far-end destination.

Communications continue until terminated in accordance with one of three possibilities: first, if the subscriber replaces the handset in its cradle in step 513, an in-band signal is generated in step 515, causing the connection to the far-end destination to be disconnected by CCP 131 in step 515. The process returns to the beginning in step 516, awaiting initiation of another outgoing call, or arrival of an incoming call. The piped connection, however, remains in effect, because switch 121 does not respond to the in-band signal generated in step 515.

Second, if the far-end disconnects in step 517, this event is detected by CCP 131, causing CCP 131 to disconnect the call in the normal fashion in step 519. This will be discerned by the subscriber in the normal fashion, causing the subscriber to replace the handset in its cradle in step 521. The process returns to the beginning in step 522, awaiting initiation of another outgoing or incoming call. Again, the piped connection, however, remains in effect, because switch 121 does not respond to the signal generated when the handset is returned to its cradle in step 521.

Third, the subscriber may, in step 523, press a button or enter a sequence of keystrokes using keypad 221 on CPE 110, which, depending upon which button is actuated or which sequence is entered, may indicate a desire to (a) disconnect the current call, or (b) disconnect the current call and initiate an new call. In the former event, the process proceeds to step 515, in which an in-band signal is generated, causing CCP 131 to disconnect the current call. In the latter event, the process proceeds to step 525, in which (like step 515) an in-band signal is generated, causing CCP 131 to disconnect the current call. However, following step 525, the process of FIG. 5 returns to step 503, so that a subsequent call may be initiated.

Figure 6:
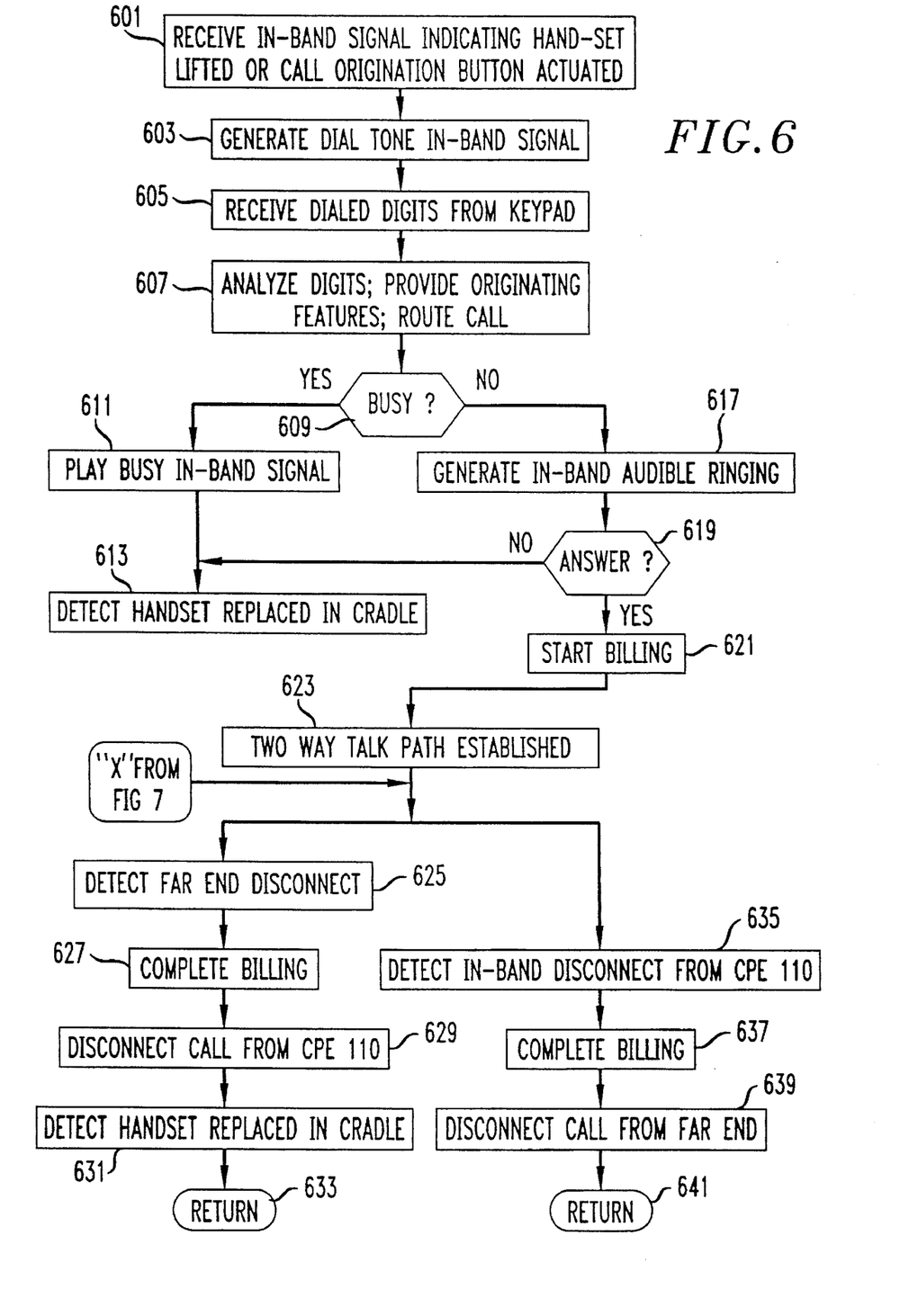
FIG. 6 is a flow diagram illustrating the steps in the process performed in call control platform 131 for originating an outbound call.

FIG. 6 is a flow diagram illustrating the steps in the process performed in call control platform 131 for originating an outbound call. The process begins in step 601, when CCP 131 receives an in-band signal from CPE 110 indicating that the had set was lifted from its cradle. Alternatively, in step 601, a call may also be initiated when CCP 131 detects that a call origination button on CPE 110 has been actuated, or when a special key sequence has been entered on keypad 221.

In step 603, CCP 131 generates and transmits to CPE 110, an in-band signal dial tone signal. Digits dialed by the subscriber using keypad 221 are received in step 605, and analyzed by digit collection and analysis element 320 in step 607. At this point in the process, any originating features, such as speed dialing, may be applied to the call, and signals sent to switch fabric 321 so as to route the outgoing call to the appropriate far-end destination.

Subsequent processing depends upon whether the far-end destination is determined, in step 609, to be busy or idle. If a YES result occurs in step 609, indicating a busy condition, an in-band busy signal is played or provided to the subscriber in step 611, causing the subscriber to return the handset to its cradle. This is detected in step 613, whereby the process returns to the beginning, in step 615, to await origination of a subsequent call.

If a NO result occurs in step 609, the far-end destination is idle, and an in-band audible ringing signal is played to the subscriber in step 617. Ringing continues until it is determined in step 619 that the far-end destination has answered. If a NO result occurs in step 619, the subscriber will again return the handset to its cradle, and the process proceeds to step 613, described above.

If a YES result occurs in step 609, the billing process in billing processor 322 of FIG. 3 is started in step 621, and a two-way talk path is established in step 623 between the subscriber at CPE 110 and the called party at the far-end destination. This status continues until the call is terminated, either when the far-end disconnects, or when the subscriber at CPE 110 disconnects.

If CCP 131 detects a far-end disconnect in step 625, the billing process is completed in step 627, and, in step 629, the current call is disconnected from CPE 110 such that the subscriber is aware that the far-end has disconnected. This would ordinarily be accomplished by maintaining silence on the line, or by playing an announcement to the subscriber. In either event, the subscriber would return the handset to its cradle, which action is detected in step 631, causing the process to return to the beginning in step 633. Note that the piped connection remains in effect.

If CCP 131 detects an in-band disconnect signal from CPE 110 in step 635, which occurs for example, because the subscriber has returned the handset to its cradle, the billing process is completed in step 637, and, in step 639, the current call is disconnected from the far-end. This would ordinarily be accomplished by generating an appropriate disconnect signal illustratively in network/trunk interface 330. The process then returns to the beginning in step 641. Note again that the piped connection remains in effect.

Figure 7:
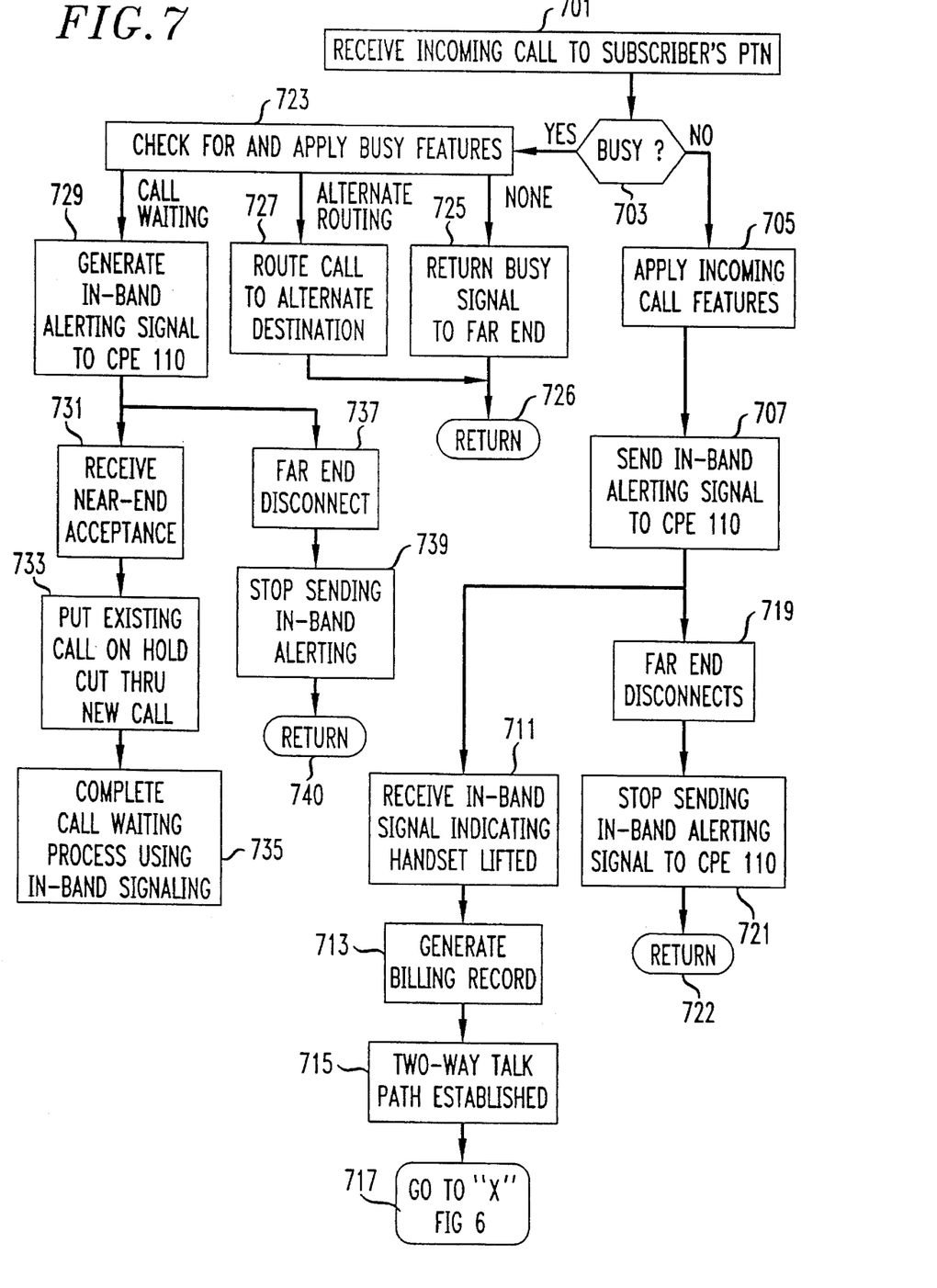
FIG. 7 a flow diagram illustrating the steps in the process performed in call control platform 131 for receiving an incoming call.

Referring now to FIG. 7, there is shown a flow diagram illustrating the steps in the process performed in call control platform 131 for receiving an incoming call. The process begins in step 701, when a call placed to a personal telephone number (PTN) associated with a particular subscriber using the present invention, is routed to CCP 131. As an example, the PTN can be a "500", "700" or "800" number that is unique to an individual subscriber, and that "follows" the subscriber to any location at which the subscriber is currently present. In this example, the call would be routed by the first switch encountered in IXC network 130, using information obtained from a data base lookup which associates the 500, 700 or 800 number with the routing number for CCP 131.

When a call is received in CCP 131, a determination is made in step 703 as to whether the CPE 110 is busy, perhaps on another incoming call or on a previously initiated outgoing call. If a NO result occurs in step 703, the appropriate incoming call features for the particular called subscriber identified by the incoming call are applied in step 705. This would include, for example, forwarding the call to another location in the event that the subscriber had invoked call forwarding, or invoking distinctive call alerting. Next, in step 707, an in-band alerting signal is sent to CPE 110, causing an audible alerting signal to be generated.

In response to the alerting signal generated as a result of the signal transmitted in step 707, the subscriber will or will not answer the call; in the latter event, the far-end caller will disconnect. Each situation is discussed in turn.

If CCP 131 receives an in-band signal in step 711, indicating that the handset on CPE 110 has been lifted, this indicates that the incoming call has been answered. In this event, a billing record may be generated in step 713, if a charge is imposed on a user of the present invention with respect to incoming calls. However, this step is optional. Next, in step 715, a two-way talk path is established between the caller at the far-end and the subscriber at CPE 110. The process then proceed to step 717, which transfers control to either step 625 or 635 in FIG. 6, depending upon how the call is terminated. If CCP 131 does not receive an in-band signal in step 711, but, instead, the far-end caller disconnects in step 719, the process proceeds to step 721, so that CCP 131 stops sending the in-band alerting signal to CPE 110. The process proceeds to step 722 and then returns to the beginning, to await: another incoming call.

If a YES result occurs in step 703, indicating the CPE 110 is busy, the subscriber's profile is checked in step 723 to determine if this subscriber has any "busy features" which specify what is to be done with an incoming call when the subscriber is engaged in another call. If the subscriber has no such features, the process proceeds to step 725, in which a busy signal is returned to the far-end caller, and the process returns to the beginning in step 726.

If the subscriber's profile provides for alternate routing, the incoming call is routed to the alternate destination in step 727, and the process proceeds to step 726 and returns to the beginning to await another call. If the subscriber's profile provides for "call waiting" functionality, the process proceeds to step 729, in which a distinctive in-band alerting signal is generated and applied to the CPE. This signal should not simulate the familiar tone that accompanies an incoming call when conventional call waiting service is provided to distinguish this case from LEC initiated call-waiting.

After the in-band call waiting signal is generated in step 729, an "acceptance" indication may be received from the subscriber in step 731, indicating that the subscriber wishes to answer the incoming call, or the far-end may disconnect the call in step 737. In the former event, the existing call is placed on hold in step 733, and the new call is cut through to the subscriber at CPE 110, following which the call waiting process is completed using in-band signaling in step 735. On the other hand, in the latter event, CCP 131 stops sending the in-band alerting signal in step 739, and the process proceeds to step 740, where it returns to the beginning to await arrival of a new call or completion of the current call.

Figure 8:
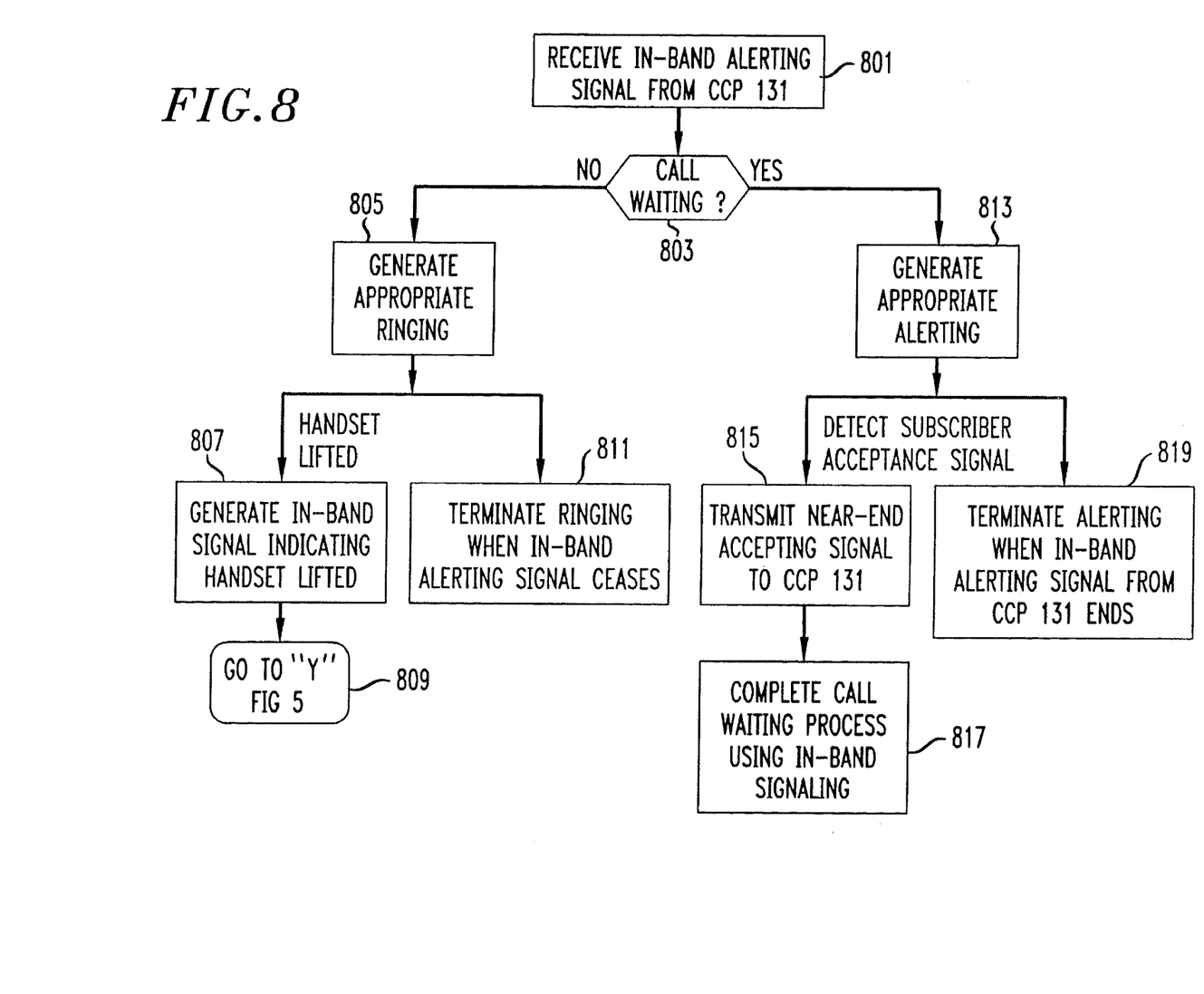
FIG. 8 a flow diagram illustrating the steps in the process performed in CPE 110 for the process for receiving an incoming call, when the call is placed to a subscriber's PTN and routed to CPE 110 from call control platform 131.

FIG. 8 a flow diagram illustrating the steps in the process performed in CPE 110 for the process for receiving an incoming call, when the call is placed to a subscriber's PTN and routed to CPE 110 from call control platform 131. The process begins in step 801, when CPE 110 receives an in-band alerting signal from CCP 131, and proceeds to step 803, where a determination is made as to whether the incoming call is a call waiting call (because CPE 110 is already engaged in an on-going call) or is a new call to an "idle" line.

If the result in step 803 is NO, indicating that there is no other call being handled, the appropriate ringing signal is generated in step 805, causing ringer 222 to be activated. In response, the subscriber may or may not answer the call. If the subscriber answers the call, the handset is lifted from its cradle, and an in-band signal indicating that the handset has been lifted in generated in step 807. The process then proceeds to step 809, in which control is transferred to step 511 of FIG. 5, where a two-way talk path is established and the call can continue until terminated. On the other hand, if the subscriber does not answer the call, the process proceeds to step 811, in which ringing is terminated when CCP 131 ceases to continue providing the in-band alerting signal.

If call waiting is invoked, and the result in step 803 is YES, the appropriate alerting signal is generated in step 813. This signal is an "alerting" signal rather than a "ringing" signal as generated in step 805, since, in this case, the subscriber is engaged in an on-going call and receives the alerting signal through the handset and not ringer 222.

In response to the alerting signal generated in step 813, the subscriber may or may not respond with an "acceptance" signal indicating a desire to place the existing call on hold and to be connected to the incoming call. This acceptance signal may be a switch hook flash, or actuation of a button on the CPE, or entry of a special key sequence using keypad 221. If an acceptance signal is entered by the subscriber, an in-band acceptance signal is transmitted from CPE 110 to CCP 131 in step 815, and the process proceeds to step 817, in which the call waiting process is completed using in-band signaling between CPE 110 and CCP 131. On the other hand, if an acceptance signal is not entered by the subscriber, the alerting signal generated in step 813 is terminated in step 819, when the in-band alerting signal from CCP 131 ends.

Figure 9:
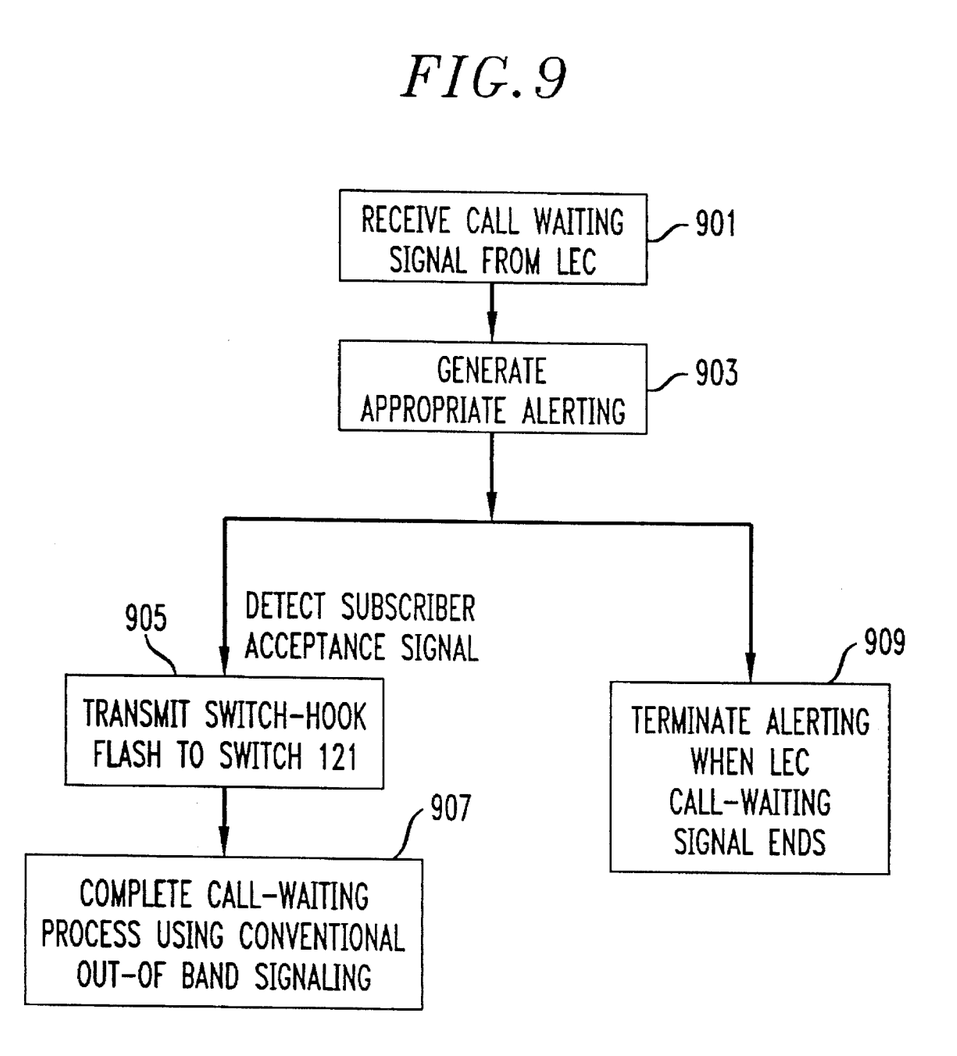
FIG. 9 is a flow diagram illustrating the steps in the process performed in CPE 110 for the process for receiving an incoming call, when the call is placed to a subscriber's ordinary telephone number and routed to CPE 110 from the LEC to which the CPE is connected.

FIG. 9 is a flow diagram illustrating the steps in the process performed in CPE 110 for the process for receiving an incoming call, when the call is placed to a subscriber's CPE location telephone number and routed to CPE 110 from the LEC to which the CPE is connected. Ordinarily, if CPE 110 is not arranged to provide call waiting functionality, a caller that places a call to the subscriber's CPE location telephone number will receive a busy indication at any time when the piped connection between CPE 110 and CCP 131 is in effect. However, as indicated in FIG. 9, such a call may be received in CPE 110 by subscribing to the LEC call-waiting feature (if available) and arranging CPE 110 to recognize and appropriately respond to the conventional call waiting signal generated by LEC switch 121.

The process of FIG. 9 begins in step 901, in which a call waiting signal is received in CPE 110. In response, CPE 110 generates an appropriate alerting signal in step 903. Note here that this signal may be different from the alerting signal generated in step 813, so that the subscriber is aware that the incoming call was placed to the subscriber's CPE location telephone number rather than the subscriber's PTN.

In response to the alerting signal generated in step 903, the subscriber may or may not respond with an "acceptance" signal indicating a desire to place the existing call on hold and to be connected to the incoming call. This acceptance signal may be a switch hook flash, or actuation of a button on the CPE, or entry of a special key sequence using keypad 221. If an acceptance; signal is entered by the subscriber, switch-hook flash is generated by CPE 110 in step 905. This is an out-of-band signal, and is detected in switch 121, since the piped connection passes through that switch. Accordingly, the call waiting process may then be completed using conventional out-of-band signaling, in step 907. On the other hand, if an acceptance signal is not entered by the subscriber, the alerting signal generated in step 903 is terminated in step 909, when the out-of-band altering signal from LEC switch 121 ends.

Various modification and adaptations of the present invention will be apparent to persons skilled in the art. For that reason, it is intended that the invention be limited only by the appended claims.

What is claimed is:

1. A method for completing a telephone call originated from a subscriber location, comprising the steps of
    establishing an initial connection between specialized CPE at said subscriber location and a call control platform in an IXC network;
    after said initial connection is established, enabling said CPE to respond to in-band signaling from said call control platform and disabling said CPE from generating a disconnect signal that would otherwise cause said CPE to be disconnected from said call control platform when said CPE is placed in an on-hook condition; and
    initiating an outbound call from said CPE by establishing a connection between said call control platform and a destination using in-band signaling between said CPE and said call control platform.

2. The method defined in claim 1 wherein said initial connection is established by dialing toll free number.

3. A method for originating and receiving telephone calls at a subscriber location, comprising the steps of
    establishing an initial connection between specialized CPE at said subscriber location and a call control platform in an IXC network;
    after said initial connection is established, enabling said CPE to respond to in-band signaling from said call control platform and disabling said CPE from generating a disconnect signal that would otherwise cause said CPE to be disconnected from said call control platform when said CPE is placed in an on-hook condition; and
    alerting said CPE to receipt of an inbound call while in said on hook condition, by signaling said CPE from said call control platform using in-band signaling.

4. The method defined in claim 3 further including the step of initiating an outbound call from said CPE by establishing a connection between said call control platform and a destination using in-band signaling between said CPE and said call control platform.

5. The method defined in claim 1 or 3 wherein said initial connection between said call control platform and said CPE is torn down automatically, if not used within a predetermined period of time.

6. The method defined in claim 1 or 3 wherein said initial connection between said call control platform and said CPE is torn down in response to a subscriber initiated signaling sequence.

7. The method defined in claim 1 wherein said method further includes replacing conventional CPE at said subscriber location with said specialized CPE prior to said establishing step.

8. The method defined in claim 1 wherein said initial connection is maintained for a sequence of calls between said call control platform and a respective series of destinations.

9. The method defined in claim 1 wherein said method further includes exchanging in-band signaling between said CPE and said call control platform, said in-band signaling including information identifying said subscriber.

10. The method defined in claim 9 wherein said identifying information includes a personal identification number assigned to said subscriber.

11. The method defined in claim 8 wherein said call control platform provides originating features and functions based upon a profile associated with said personal identification number.

12. The method defined in claim 10 wherein calls placed to said subscriber are made using said personal identification number to route said calls to said call control platform.

13. The method defined in claim 12 wherein, responsive to receipt in said call control platform of a call placed to said subscriber, said method further includes alerting said specialized CPE by in-band signaling.

14. The method defined in claim 13 wherein said alerting step includes causing distinctive ringing to occur at said specialized CPE using in-band signaling.

15. The method defined in claim 3 further including providing terminating features and functions for incoming calls to said call control platform using said profile that is associated with a personal identification number assigned to said subscriber.

16. The method defined in claim 1 wherein said call is disconnected by activating a key on said CPE.

17. The method defined in claim 1 further including sending an in-band signal from said CPE to said call control platform to terminate said call without disturbing the initial connection existing between said CPE and said call control platform.

18. A method of completing telephone calls to and from a subscriber location, comprising the steps of
    initiating a telephone call from said subscriber location to a call control platform in an IXC network using customer premises equipment operating in a conventional mode;
    switching said CPE to operate in a bypass mode wherein (a) said CPE responds to in-band ringing signals, and (b) said CPE is disabled from terminating the connection between said CPE and said call control platform by a switch hook actuation; and
    processing subsequent inbound and outbound calls to and from said CPE using in-band signaling.

19. A method of completing telephone calls to and from a subscriber location, comprising the steps of
    establishing a piped connection between CPE at said subscriber location and a call control platform in a long distance network, said piped connection being made via at least one switch in a local network;
    temporarily altering the operation of said CPE to perform in-band signaling for ringing and switch hook actuation; and
    while said CPE is temporarily altered, completing subsequent calls to and from said CPE using in-band signaling that is not detected by said at least one switch.

20. The method of claim 19 wherein said call control platform is arranged to provide features for said telephone calls to and from a subscriber location based upon a stored profile.

21. Apparatus for initiating and receiving telephone calls, comprising
    a ringer,
    a switch hook, means for operating said apparatus in a conventional mode wherein said ringer responds to out-of-band signals and said switch hook generates out-of-band signals, and means for operating said apparatus in a bypass mode wherein said ringer responds to in-band signals and said switch hook generates in-band signals.

22. The apparatus of claim 21 wherein said apparatus further includes means for switching said apparatus between said conventional mode and said bypass mode.

23. The apparatus of claim 22 wherein said mode switching means is responsive to remotely generated signals.

24. The apparatus of claim 22 wherein said mode switching means is responsive to locally generated signals.

25. Apparatus for completing a telephone call originated from a subscriber location, comprising means for establishing, while said apparatus is in a conventional mode, an initial connection to a call control platform in an IXC network;

means for switching said apparatus from said conventional mode to a bypass mode after said initial connection is established, whereby said apparatus is enabled to respond to in-band signaling from said call control platform and disabled from generating a disconnect signal that would otherwise cause said CPE to be disconnected from said call control platform when said CPE is placed in an on-hook condition.

26. The invention defined in claim 25 further including means for switching said apparatus from said bypass mode to said conventional mode after a predetermined period of time.

27. The invention defined in claim 25 further including means for switching said apparatus between said bypass mode and said conventional mode in response to receipt of a locally generated signal.

* * * * *